(12) United States Patent
Bygott et al.

(10) Patent No.: US 7,521,039 B2
(45) Date of Patent: Apr. 21, 2009

(54) PHOTOCATALYTIC RUTILE TITANIUM DIOXIDE

(75) Inventors: Claire Bygott, Grimsby (GB); Michel Ries, Orly (FR); Stephen P. Kinniard, Ellicott City, MD (US)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 749 days.

(21) Appl. No.: 10/291,104

(22) Filed: Nov. 8, 2002

(65) Prior Publication Data

US 2004/0092393 A1    May 13, 2004

(51) Int. Cl.
    *C01G 23/047*    (2006.01)
(52) U.S. Cl. .................. 423/659; 423/610; 502/350; 501/11; 501/94; 106/436
(58) Field of Classification Search .............. 423/610, 423/659; 502/350; 106/436; 501/11, 94
    See application file for complete search history.

(56) References Cited

U.S. PATENT DOCUMENTS

| | | | |
|---|---|---|---|
| 4,024,296 A | 5/1977 | Gruber | |
| 4,242,423 A | 12/1980 | Hada | |
| 4,544,470 A | 10/1985 | Hetrick | |
| 4,927,464 A | 5/1990 | Cowie | |
| 5,049,309 A | 9/1991 | Sakamoto et al. | |
| 5,147,686 A | 9/1992 | Ichimura et al. | |
| 5,194,161 A | 3/1993 | Heller et al. | |
| 5,203,916 A | 4/1993 | Green et al. | |
| 5,451,252 A * | 9/1995 | Elfenthal et al. ............ | 106/436 |
| 5,480,324 A | 1/1996 | Maegawa et al. | |
| 5,480,636 A | 1/1996 | Maruo et al. | |
| 5,501,801 A | 3/1996 | Zhang et al. | |
| 5,518,992 A | 5/1996 | Linkous | |
| 5,541,096 A | 7/1996 | Nomura et al. | |
| 5,547,823 A * | 8/1996 | Murasawa et al. .......... | 430/531 |
| 5,604,339 A | 2/1997 | Tabatabale-Raissi et al. | |
| 5,616,532 A | 4/1997 | Heller et al. | |
| 5,686,372 A | 11/1997 | Langford et al. | |
| 5,689,798 A | 11/1997 | Oeste | |
| 5,693,329 A | 12/1997 | Marchi-Lemann et al. | |
| 5,755,867 A | 5/1998 | Chikuni et al. | |
| 5,759,948 A | 6/1998 | Takaoka et al. | |
| 5,817,427 A | 10/1998 | Ishida et al. | |
| 5,849,200 A | 12/1998 | Heller et al. | |
| 5,854,169 A | 12/1998 | Heller et al. | |
| 5,872,072 A | 2/1999 | Mouri et al. | |
| 5,919,422 A | 7/1999 | Yamanaka et al. | |
| 5,919,726 A | 7/1999 | Hatano et al. | |
| 5,933,702 A | 8/1999 | Goswani | |
| 5,939,194 A | 8/1999 | Hashimoto et al. | |
| 5,948,355 A | 9/1999 | Fujishima et al. | |
| 5,981,425 A | 11/1999 | Taoda et al. | |
| 6,001,326 A * | 12/1999 | Kim et al. ................... | 423/598 |
| 6,013,372 A | 1/2000 | Hayakawa et al. | |
| 6,033,459 A | 3/2000 | Hase | |
| 6,066,359 A | 5/2000 | Yao et al. | |
| 6,077,492 A | 6/2000 | Anpo et al. | |
| 6,090,736 A * | 7/2000 | Taoda et al. ................. | 502/5 |
| 6,099,695 A | 8/2000 | Fujishima et al. | |
| 6,107,241 A | 8/2000 | Ogata et al. | |
| 6,113,861 A | 9/2000 | Ogata | |
| 6,117,229 A | 9/2000 | Cassar et al. | |
| 6,121,191 A | 9/2000 | Komatsu et al. | |
| 6,165,256 A | 12/2000 | Hayakawa et al. | |
| 6,217,999 B1 | 4/2001 | Zhang et al. | |
| 6,246,253 B1 | 6/2001 | Kang et al. | |
| 6,265,341 B1 | 7/2001 | Komatsu et al. | |
| 6,277,346 B1 | 8/2001 | Murasawa et al. | |
| 6,284,364 B1 | 9/2001 | Sugizaki et al. | |
| 6,313,064 B1 | 11/2001 | Miyafuji et al. | |
| 6,315,963 B1 | 11/2001 | Speer | |
| 6,337,129 B1 | 1/2002 | Watanabe et al. | |
| 6,365,545 B1 | 4/2002 | Komatsu et al. | |
| 6,406,536 B1 | 6/2002 | Cassar et al. | |
| 6,409,821 B1 | 6/2002 | Cassar et al. | |
| 6,429,169 B1 | 8/2002 | Ichinose | |
| 6,458,452 B1 | 10/2002 | Hayashi et al. | |
| 6,465,388 B1 | 10/2002 | Hozumi et al. | |
| 6,479,745 B2 | 11/2002 | Yamanaka et al. | |
| 6,498,000 B2 | 12/2002 | Murasawa et al. | |
| 6,517,804 B1 | 2/2003 | Kim et al. | |
| 6,524,664 B1 | 2/2003 | Hashimoto et al. | |

(Continued)

FOREIGN PATENT DOCUMENTS

EP    0 444 798 B1    4/1991

(Continued)

OTHER PUBLICATIONS

Yu, et al., "Photocatalytic Degradation of a Gaseous Organic Pollutant" J. of Chemical Education, Jun. 1998, 75, 6, pp. 750-751.*

(Continued)

*Primary Examiner*—Steven Bos
(74) *Attorney, Agent, or Firm*—Dunlap Codding, P.C.

(57) ABSTRACT

The present invention is directed to photocatalytically active rutile titanium dioxide. The photocatalytically active rutile titanium dioxide of the present invention demonstrates enhanced activity in the visible light spectrum. It may be produced by neutralizing rutile seed to a higher pH than that at which it has traditionally been neutralized prior to washing and thermally treating the seed.

18 Claims, No Drawings

U.S. PATENT DOCUMENTS

| | | | |
|---|---|---|---|
| 6,544,493 B1 | 4/2003 | Tanaka et al. | |
| 6,566,300 B2 | 5/2003 | Park et al. | |
| 6,569,520 B1 | 5/2003 | Jacobs | |
| 6,558,553 B1 | 6/2003 | Amal et al. | |
| 6,576,344 B1 | 6/2003 | Doushita et al. | |
| 6,576,589 B1 | 6/2003 | Na et al. | |
| 6,610,400 B2 | 8/2003 | Novich et al. | |
| 6,632,771 B1 | 10/2003 | Mackawa et al. | |
| 6,635,232 B1 | 10/2003 | Yaita et al. | |
| 6,653,356 B2 | 11/2003 | Sherman | |
| 6,656,261 B2 | 12/2003 | Tear et al. | |
| 6,673,331 B2 | 1/2004 | Sakatani et al. | |
| 6,680,277 B2 | 1/2004 | Morikawa et al. | |
| 6,683,023 B2 | 1/2004 | Ito et al. | |
| 6,699,577 B2 | 3/2004 | Nonoyama et al. | |
| 2002/0016250 A1 | 2/2002 | Hayakawa et al. | |
| 2002/0029955 A1 | 3/2002 | Sahle-Demessie et al. | |
| 2003/0091500 A1 | 5/2003 | Koinuma et al. | |
| 2003/0096102 A1 | 5/2003 | Yoshihara et al. | |
| 2003/0144140 A1 | 7/2003 | Matsuo et al. | |
| 2003/0148881 A1 | 8/2003 | Matsuo et al. | |
| 2003/0165680 A1 | 9/2003 | Brady et al. | |
| 2003/0167878 A1 | 9/2003 | Al-Salim et al. | |
| 2003/0181329 A1 | 9/2003 | Tanaka et al. | |
| 2003/0232186 A1 | 12/2003 | Matsuda et al. | |

FOREIGN PATENT DOCUMENTS

| | | |
|---|---|---|
| EP | 0 737 513 | 10/1996 |
| EP | 0 590 477 | 2/1997 |
| EP | 0 774 443 | 5/1997 |
| EP | 1 027 924 | 8/2000 |
| EP | 1 065 169 | 1/2001 |
| EP | 1 095 908 | 5/2001 |
| JP | 11-349328 * | 12/1999 |
| JP | 2000-117117 * | 4/2000 |
| WO | WO 98/23374 | 6/1998 |
| WO | WO 98/43733 | 10/1998 |
| WO | WO 00/10706 | 3/2000 |
| WO | WO 01/56928 | 8/2001 |

OTHER PUBLICATIONS

Hoffmann, et al., "Environmental Applications of Semiconductor Photocatalysis" Chem. Rev., 1995, no month, 95, pp. 69-96.*

"PCT International Search Report," International Searching Authority United States (ISA/US), Mar. 15, 2004.

English translation of JP 11349328 published on Dec. 21, 1999.

Degussa Technical Information No. 1243 dated Dec. 2005.

Degussa Product Information dated Jul. 2006, www.aerosil.com.

Hydophilic Fumed Metal Oxides dated Aug. 21, 2007, www.aerosil.com.

* cited by examiner

PHOTOCATALYTIC RUTILE TITANIUM DIOXIDE

FIELD OF THE INVENTION

The present invention relates to the field of photocatalysis.

BACKGROUND

Photocatalysis involves the use of a semiconductor that when illuminated by light of sufficient energy produces highly reactive species that chemically attack molecules. Semiconductors and the photocatalysts into which they are incorporated are of particular interest to researchers and consumers, in large part because they may be used in pollution abatement applications, such as the treatment of gaseous, liquid and bacteriological matter. However, environmental applications are not their only use; for example, they may also be used to produce superhydrophilic surfaces for applications such as antifogging mirrors and self-cleaning windows.

Photocatalysts typically comprise one or more metal oxides, such as titanium dioxide, zinc oxide, tungsten oxide and/or zirconium oxide. Titanium dioxide, which is a particularly common photocatalyst, has for example, been used in applications, such as air-conditioning to remove toxic or malodorous substances, water purification and destruction of harmful bacteria.

Titanium dioxide, also commonly referred to as titania or titanium oxide, may exist in one of three crystalline forms, rutile, anatase and brookite or mixtures of these forms, as well as in the non-crystalline form of titanium hydroxide. Commercially, titanium dioxide may be used in both pigmentary applications, e.g., coatings, plastics and paints, as well as in non-pigmentary applications, e.g., ultraviolet light absorbing materials such as sunscreens and photocatalysts. However, of the aforementioned forms, only the crystalline forms exhibit photocatalytic activity, and of the crystalline forms, only anatase and rutile have potential commercial applicability as photocatalysts.

Photocatalysts function by absorbing light of sufficient energy to promote an electron of a semiconductor from the valence band to the conduction band. This energy is referred to as the band gap energy, and is typically quoted in electron-volts (eV), or by the wavelength (in nanometers or nm) of a photon that possesses this band gap energy. For example, rutile titanium dioxide has a band gap energy of 3.0 eV, which corresponds to approximately 413 nm, and anatase titanium dioxide has a band gap of 3.2 eV, which corresponds to approximately 388 nm.

Within the field of photocatalysis, anatase titanium dioxide has established a reputation as generally superior to rutile titanium dioxide, though no fundamental reason for this difference has been identified. By contrast, the primary commercial applications of rutile titanium dioxide have been as white pigments due to rutile titanium dioxide's high refractive index, and secondarily as ultraviolet absorbers in sunscreens, coatings and plastics applications.

When a titanium dioxide crystal absorbs a photon of sufficient energy, an electron is promoted to the conduction band, and a positive hole ($h^+$) is generated in the valence band. This "electron-hole pair" generates highly oxidizing hydroxyl and superoxide radicals at the crystal surface that are capable of oxidizing practically all organic matter to $CO_2$ and $H_2O$. This complete oxidation is referred to as "mineralization."

The early applications of titanium dioxide in photocatalysts used nearly exclusively ultraviolet light sources as is required by the band gap energies of anatase titania. Ultraviolet (UV) light refers to light of a wavelength below about 400 μm. By contrast, light from the visible spectrum refers to light of a wavelength from about 400 nm to about 700 nm.

Recently, there has been attention given to finding ways in which the photocatalytic activity of titania can be expanded into the visible spectrum, in part because UV light constitutes only a relatively small fraction of sunlight and in part because indoor lighting is typically very low in UV intensity. If a larger proportion of the electromagnetic spectrum could be used, then a more efficient catalytic performance could be achieved and a larger number of potential applications could be realized.

Attempts to utilize visible light have included doping photocatalysts with elements such as chromium, reducing titanium dioxide and doping with nitrogen. Unfortunately, all of these techniques suffer from the drawback of generating a colored product, which is to be expected if some of the visible light is absorbed; Although the generation of a colored product may be satisfactory from a technical perspective, due to aesthetic constraints, a colored product tends to limit commercial applicability. A more desirable product would be a white product that more efficiently utilizes available near-UV light, i.e., visible light, than the current commercial anatase products utilize.

As noted above, rutile titanium dioxide has a band gap that utilizes a larger proportion of the available spectrum and would seem to be an ideal choice for a photocatalyst that operates under low levels of UV illumination, without compromising the aesthetics of color. Historically, when rutile titanium dioxide has been considered applicable as a photocatalyst, it has been in a state in which the rutile crystals are "metallized," that is, containing small islands of metals such as platinum, rhodium, gold and silver on the rutile crystals. Unfortunately, such catalysts are prohibitively costly.

Thus, there is a need to develop a useful and economical rutile titanium dioxide photocatalyst that can be activated by visible light. The present invention addresses this need.

SUMMARY OF THE INVENTION

The present invention is directed to rutile titanium dioxide photocatalysts that have enhanced activity, particularly when exposed to visible light.

According to one embodiment, the present invention provides for a titanium dioxide photocatalyst comprised of titanium dioxide particles, wherein said titanium dioxide particles:

(a) are in a rutile crystal phase;

(b) have an alkaline water soluble pH;

(c) have a surface area greater than 15 $m^2$/gram;

(d) have a mean particle size less than 100 nm; and (e) have a conductivity of greater than 10 microsiemens per centimeter when mixed with demineralized water at a concentration of 6 grams per 100 grams of water.

According to a second embodiment, the present invention provides a method of photocatalytically treating a compound, said method comprises exposing a photocatalyst to light, wherein said photocatalyst is comprised of titanium dioxide particles that:

(a) are in a rutile crystal phase;

(b) have an alkaline water soluble pH;

(c) have a surface area greater than 15 $m^2$/gram; and (d) have a mean particle size less than 100 nm.

Preferably, the particles have a conductivity of greater than 10 microsiemens per centimeter when mixed with demineralized water at a concentration of 6 grams per 100 grams of water.

The photocatalysts of the present invention provide an economical source for a semiconductor that may be activated by ultraviolet and/or visible light.

DETAILED DESCRIPTION OF THE INVENTION

The present invention is directed to the use of rutile titanium dioxide as a photocatalyst. The photocatalyst of the present invention may be activated by visible and/or ultraviolet light to treat either organic or inorganic compounds.

The present invention is not intended to be a treatise on photocatalysts. Readers are referred to appropriate available texts for background on this subject.

Under one embodiment, the present invention is directed to a photocatalyst comprised of titanium dioxide particles that are in the rutile crystal form and that have a water soluble pH greater than 5. More preferably the water soluble pH is alkaline (i.e. greater than 7), and most preferably greater than 8. Additionally, preferably, the particles have a surface area greater than 15 $m^2/gm$ and a mean particle size of less than 100 nm. Moreover, the particles preferably have a conductivity of greater than 10 microsiemens per centimeter when mixed with demineralized water at a concentration of 6 grams per 100 grams of water. More preferably, the particles have a conductivity of greater than 100 microsiemens per centimeter when mixed with demineralized water at a concentration of 6 grams per 100 grams of water.

Within the photocatalyst, preferably as much of the titanium dioxide as possible will be in the form of rutile crystals. However, due to practical limitations, within the photocatalyst, there may be a certain amount of anatase crystals, as well as other forms of titanium dioxide. Accordingly, with respect to the present invention, preferably, at least 50% of the titanium dioxide of the photocatalyst will be rutile in form, more preferably 80%, and most preferably, substantially all of the titanium dioxide will be rutile in form.

The water soluble pH refers to the measurement of the pH of a photocatalyst product that is taken by crushing and mixing a small quantity of dried or calcined product in demineralized water and measuring the pH of the resultant mixture. In anatase photocatalysts, this pH is typically acidic due to the presence of either residual sulfate ions when the photocatalytic anatase is prepared from hydrolyzed titania, or residual chloride ions when the photocatalytic anatase is prepared from gas phase oxidation of $TiCl_4$. By contrast, the water soluble pH of the photocatalyst of the present invention is preferably greater than 5, more preferably alkaline (i.e. greater than pH 7), and most preferably greater than pH 8.

Conductivity of the particles is a measurement of the residual ions present, and measuring conductivity of particles by placing them in demineralized water is well known to persons skilled in the art. A particularly surprising discovery was that the effectiveness of the mineralization of organics to $CO_2$ is affected by the residual ions on the photocatalyst. These ions are generated during the processing the titanium dioxide. The particular substances used during processing and neutralization steps for generating the titanium dioxide photocatalyst will dictate the composition of the ions present. Examples of ions include but are not limited to potassium and sodium. The amount of these ions can be controlled by the concentration, amount and type of neutralizing agent used during neutralization, the final pH before washing, the degree of washing and the drying or calcination conditions.

A higher conductivity is indicative of a higher degree of conversion to $CO_2$ for a given quantity of oxygen consumed. As one typical objective of the photocatalyst is to oxidize completely organics to $CO_2$ and $H_2O$, a high conductivity is a desirable property, since it means that fewer intermediates are present. However, although the presence of residual ions improves selectivity toward $CO_2$, residual ions are detrimental to total activity as measured by oxygen consumption. Consequently, a balance is needed in order to achieve good photocatalytic activity with a high degree of selectivity. This balance is best achieved with the above described high surface area, and high water soluble pH in the presence of a moderate quantity of residual ions.

The photocatalyst of the present invention may, for example, be incorporated into a photocatalytic article. The phrase "photocatalytic article" refers to a substrate that has been combined with a photocatalyst. According to the present invention, preferably the substrate is selected from the group consisting of ceramic tile, glass, concrete, metals and polymeric substances and is coated with the above-described photocatalytic particles. Methods for incorporating photocatalysts into photocatalytic articles are well known to persons skilled in the art.

The photocatalyst may also be incorporated directly or as part of a photocatalytic article into a "photocatalytic composition." Examples of photocatalytic compositions include but are not limited to photocatalytic paints, photocatalytic coatings, photocatalytic cement and photocatalytic mortar. Methods for incorporating photocatalysts and/or photocatalytic articles into photocatalytic compositions are also well known to persons skilled in the art.

The photocatalysts of the present invention may be used directly or as part of photocatalytic articles or photocatalytic compositions in applications, including but not limited to, environmental abatement and defogging of mirrors and glass by exposing the photocatalyst, the photocatalytic article or photocatalytic composition to ultraviolet and/or visible light.

According to a second embodiment, the present invention provides a method for photocatalytically treating a compound. According to this method, one exposes a photocatalyst to light in the presence of the compound to be treated, wherein said photocatalyst is comprised of titanium dioxide particles that:

(a) are in a rutile crystal phase;
(b) have an alkaline water soluble pH;
(c) have a surface area greater than 15 $m^2$/gram; and
(d) have a mean particle size less than 100 nm.

Preferably, the particles have a conductivity of greater than 10 microsiemens per centimeter when mixed with demineralized water at a concentration of 6 grams per 100 grams of water, and more preferably greater than 100 microsiemens per centimeter when mixed with demineralized water at a concentration of 6 grams per 100 grams of water.

According to this method one may expose the photocatalyst to visible and/or ultraviolet light. The particles may, for example, be incorporated into the above-described photocatalytic articles and/or compositions.

Although not wishing to be bound by any one method for production of the photocatalysts of the present invention or articles or compositions that incorporate them, Applicants note that these materials may efficiently be generated by neutralizing a rutile titanium dioxide seed at an alkaline pH, washing and then thermally treating the titanium dioxide.

Surprisingly, the neutralization pH of the rutile seed prior to washing has a significant impact upon the photocatalytic activity of a thermally treated product. Neutralization to a higher pH, followed by washing and thermal treatment such as drying or calcining results in a more active rutile photocatalyst, in some cases exceeding the activity of anatase photocatalysts.

In theory, any source of rutile titanium dioxide with a sufficient amount of rutile crystallization and a sufficiently high surface area to mass ratio could be used; however, as a practical matter, for at least two reasons it is preferable to begin with a rutile seed. First, not only do rutile seeds have the necessary crystalline structure, but also in generating these seeds, the high degrees of crystallinity can be achieved at relatively low temperatures. Thus, it is an economical source of the rutile titanium dioxide. Second, whereas typical pigmentary rutile titanium dioxide has a surface area of 5-10 $m^2$/gram, by using rutile seed, particles with a surface area of greater than 15 $m^2$/gram can easily be produced. By providing a relatively larger surface area, activity may be increased.

The phrase "rutile seed" refers to a composition that is comprised of rutile titanium dioxide that when incorporated into processes for making rutile titanium dioxide pigments facilitates the generation of more rutile titanium dioxide. As persons skilled in the art are aware, in the sulfate process, it is common to use rutile seeds in order to generate rutile titanium dioxide.

In the typical sulfate process, a titanium bearing ore such as ilmenite is dissolved in concentrated sulfuric acid, purified to remove undissolved matter and hydrolyzed, e.g., by boiling to produce a titanium hydrate. The titanium hydrate is washed to remove undesirable species such as iron, and then calcined to produce either rutile or anatase titanium dioxide. During this process, a seed may be added prior to calcination in order both to assist particle size control and to induce the formation of the desired crystal types, rutile seeds being added to generate rutile crystals and anatase seeds being added to generate anatase crystals. The presence of sulfate ions favors the formation of anatase crystals. Consequently, rutile seeds are typically prepared from a sulfate free source.

For rutile seed formation, one process that is well known to persons skilled in the art is to begin with $TiCl_4$ as a raw material. Hydrolysis of $TiCl_4$ with water and optionally a base, followed by aging under acidic conditions (approximately pH 0-1) results in growth of rutile crystals that may be used as seed material.

Another process for generating seed that is well known to persons skilled in the art begins with taking titania from the sulfate process that has been hydrolyzed and washing it to remove impurities such as iron. This product may then be reacted with a strong base such as an NaOH solution to make sodium titanate. The sodium titanate is then washed to remove residual sulfate and sodium ions, and reacted with HCl to form rutile crystals in a manner analogous to the $TiCl_4$ seed preparation process.

When preparing rutile seed, preferably the generation of sulfate ions are avoided, although when using the sodium titanate route, complete elimination of sulfate is difficult. However, so long as the sulfate content is substantially reduced, satisfactory rutile seed can be prepared from the sodium titanate route.

During the production of the particles for use in the present invention, preferably a rutile seed will be neutralized, washed and thermally treated, by for example, drying or calcination. In theory, the pH of this resulting product can by acidic, neutral or alkaline depending on the pH to which the rutile seed was neutralized prior to washing and the thermal treatment temperature.

For generation of seed useful in the present invention, preferably neutralization involves the raising of the pH of the rutile titanium dioxide seed to greater than its isoelectric point, which is pH 4-5 and producing a neutralized seed. Accordingly, the pH is preferably raised to greater than pH 5.0. The phrase "neutralized seed" refers to a seed that has been rendered less acidic or more alkaline.

Any substance that is effective at raising the pH of the seed may accomplish the neutralization step. Examples of substances that may be used for neutralization in connection with the present invention include, but are not limited to, non-volatile bases such as NaOH, $Na_2CO_3$, KOH, and $K_2CO_3$. Neutralizing techniques are well known to persons skilled in the art.

Following the neutralization step, the neutralized rutile titanium dioxide seed is washed to form a washed seed. Preferably, the washing step is accomplished by the use of water, more preferably demineralized water. Washing removes undesirable species. Removal of excess quantities of species such as chloride and particularly sodium or potassium during washing is desirable because these species can have a significant impact upon the formation of the photocatalyst during subsequent thermal treatment. However, complete elimination of these substances is not necessary.

Following neutralization and washing, the washed seed is thermally treated, by, for example, calcination. As persons skilled in the art are aware, calcination to prepare photocatalysts is generally performed at lower temperatures than the temperatures at which calcination is used to prepare pigmentary titanium dioxide. Although calcination is a preferred process, any thermal treatment, including drying or hydrothermal treatment or combinations such as hydrothermal treatment followed by calcination can be used to generate seeds useful according to the present invention. For example, as in some known processes in which photocatalysts are produced, when the product of the present invention is produced, it may simply be dried at 100-150° C.

The photocatalysts produced according to this method are particularly useful in environmental abatement applications. Additionally, by tailoring the process for production, the photocatalysts may also be incorporated into photocatalytic articles and photocatalytic compositions that may be used in a number of other applications. For example, also included in the scope of the present invention would be in-situ calcination such as firing of ceramic tiles with a layer of neutralized and washed rutile seed or calcination on the surface of substrates to produce a layer of photoactive rutile such as on a mirror or window in order to defog it.

Although not wishing to be bound by any one theory, and as noted above, it is submitted that the water soluble pH of the thermally treated powder is affected by the final neutralization pH. Thus, because titanium oxide has an isoelectric point typically around 4-5, in accord with the present invention neutralization to a pH greater than about 5 before washing would give a desirable water-soluble pH after drying or calcinations.

If as in prior art techniques, the pH were below the isoelectric point, a positive charge would be exhibited on the surface of the titania. This positive charge would attract negatively charged species such as chloride ions and even after washing, the surface would have a disproportionate amount of anionic species.

In these previously known methods for generating titanium dioxide photocatalysts, which were performed at low calcination temperatures, residual sulfates and chlorides tended to remain with the titania, and when the calcined product was mixed with water, these anions exchanged with hydroxyl ions and generated an undesirably acidic solution. This problem is particularly prevalent when an ammonium-based alkali was used to neutralize the titanium dioxide, as ammonium salts tend to decompose upon calcination and the acidic species (e.g. $Cl^-$ or $SO_4^{2-}$) is partially regenerated. (In some known applications, ammonia has been preferred for the neutralization step, because ammonium salts tend to decompose upon heating and thus they require less stringent washing.)

By contrast, neutralization to a pH greater than the isoelectric point produces a negative charge on the titania surface, which attracts positively charged species such as sodium or potassium ions. Accordingly, after thermal treatment, the cationic species exchange with protons from water and would form a mildly alkaline solution such as NaOH in the case of sodium.

It should also be appreciated, and as persons skilled in the art are aware, titania used for photocatalytic purposes tends to be calcined without further metal additives, as opposed to pigmentary titanium dioxides, which tend to be calcined with metal additives. This is because the additives can have a detrimental effect upon the photocatalytic activity and particle size control, which although critical for optimizing light scattering for pigmentary purposes, is less critical for photocatalytic functionality. Thus, according to the present invention preferably no metal additives are added to the thermally treated product.

The application of rutile titanium dioxide with a water soluble pH greater than pH 5 and preferably alkaline, as a photocatalyst not only overcomes the current limitations of using rutile titanium dioxide as a photocatalyst, but also extends the benefit to applications in which a low level of UV illumination is available. Therefore, it provides the potential for being used in many applications, and is particularly useful in indoor applications.

The following examples illustrate the improvement in photocatalytic activity when using a rutile photocatalyst with an alkaline water soluble pH, but should not be construed to limit the scope of the invention.

EXAMPLES

Photocatalytic activity is measured by the well-established method of oxidation of isopropanol. Under photocatalytic oxidation, isopropanol is oxidized to acetone initially, and upon further oxidation complete mineralization to $CO_2$ and $H_2O$ occurs. Two methods of monitoring the degree of oxidation are used. The first method uses a gas phase test in which vapors of isopropanol contact a powder that is compacted into a metal template contained in a sealed glass jar and exposed to a light source. The reaction is monitored by measuring the amount of oxygen consumed as the isopropanol is oxidized. The selectivity of oxygen consumed to form $CO_2$ is a measure of the degree of mineralization, which occurs. A higher selectivity is preferable as it indicates fewer intermediates are present and the desired mineralization is occurring.

The second method involves mixing a quantity of the photocatalyst with liquid isopropanol in a sealed jar during exposure to a light source, with the degree of reaction being determined by measuring the amount of acetone that is generated.

In the examples below, the gas phase test used three black light tubes (8 watts, Phillips model F8T5BLB, 340 nm) with the sample jars arranged on a carousel with the lamps in the center of the carousel. The liquid phase test used a 300W Xenon lamp (Oriel Instruments), and for visible light testing the light from the Xenon lamp was filtered through a 435 nm filter (Schott model GG435).

Water soluble pH was measured by mixing 2 grams of the powder with 33 mls of demineralized water and measuring the pH of the resultant solution. Conductivity was measured on the same solution.

Example 1

Rutile seed was prepared by mixing hydrated titanium dioxide obtained from the thermal hydrolysis of titanium oxysulfate with concentrated NaOH solution to form sodium titanate. The sodium titanate was washed first with water and then with dilute HCl solution (pH=3) to remove soluble sulfate and excess sodium ions. The washed sodium titanate was then mixed with HCl adjusted to obtain 70 g/l HCl final concentration, heated to 90° C., held at this temperature for 60 minutes and then cooled. The product formed was rutile seed (typical dimensions: acicular shape: 80-100 nm×10×10 nm). The product was then split into 3 fractions. The first fraction (example 1A) was neutralized with NaOH to pH 5.1 and washed with acidic water (35 grams per liter $H_2SO_4$). Upon calcination, this product gave an acidic water soluble pH of 3.3. The second fraction (example 1B) was neutralized with NaOH to pH 3.4 but washed with demineralized water. Upon calcination this sample gave a slightly acidic water soluble pH of 5.7. The third sample (example 1C) was adjusted to pH 5.5 with NaOH and washed with demineralized water. Upon calcination this sample gave an alkaline water soluble pH of 9.0. Table I below lists the water soluble pH, percentage rutile content and surface area of the calcined samples. Rutile content was measured by X-ray diffraction.

TABLE I

| Sample | Water soluble pH | % Rutile | Surface Area ($m^2$/gram) |
|---|---|---|---|
| Example 1A | 3.3 | 96.8 | 37.4 |
| Example 1B | 5.7 | 97.4 | 34.5 |
| Example 1C | 9.0 | 97.6 | 35.1 |

Example 2

The calcined product from example 1 was tested for photocatalytic activity using the gas phase test. Also included in the test were a range of anatase photocatalysts manufactured by Millennium Chemicals (PC range), as well as P25, manufactured by Degussa, a mixed phase anatase/rutile photocatalyst (80/20 anatase/rutile). Table II below lists the photocatalytic activity of the samples along with the measured water soluble pHs and surface areas.

TABLE II

| Sample | Water soluble pH | Surface Area ($m^2$/g) | Photocatalytic Activity (% $O_2$ Consumption) |
|---|---|---|---|
| Example 1A | 3.3 | 37.4 | 2.0 |
| Example 1B | 5.7 | 34.5 | 2.9 |
| Example 1C | 9.0 | 35.1 | 5.5 |
| PC500 | 6.0 | 33.5 | 4.1 |
| PC105 | 4.4 | 81 | 3.8 |
| PC50 | 4.0 | 40 | 3.1 |
| PC10 | 5.1 | 8 | 1.2 |
| P25 | 3.9 | 49 | 4.3 |

The results show that increasing the water soluble pH of the calcined rutile product results in a significant increase in photocatalytic activity. Although the lower pH rutile samples (Example 1A, 1B) show the expected inferior photocatalytic activity compared to the commercial anatase products, the sample with the highest pH (example 1C) shows a higher activity. All of the commercial photocatalysts exhibit acidic water soluble pHs.

Example 3

The samples from example 1 were tested in the liquid phase isopropanol test, along with the commercial samples of anatase. The results are provided in the Table III below.

TABLE III

| Sample | Acetone generated (ppm) |
|---|---|
| Example 1A | 420 |
| Example 1B | 793 |
| Example 1C | 1435 |
| PC500 | 899 |
| PC105 | 601 |
| PC50 | 581 |
| PC10 | 191 |
| P25 | 836 |

Again, it is seen that as the water soluble pH of the rutile samples is raised, the photocatalytic activity increases, with the highest pH sample (1C) showing activity superior to the commercial anatase photocatalysts.

Example 4

The liquid phase photocatalytic activity was run with a 435 nm filter installed between the light source and the sample. Only light with a wavelength greater than 435 nm reached the sample. This is referred to as the visible light photocatalysis test; UV light is eliminated. The results are provided below in Table IV.

TABLE IV

| Sample | Acetone generated (ppm) |
|---|---|
| Example 1A | 53 |
| Example 1B | 87 |
| Example 1C | 223 |
| PC500 | 32 |
| P25 | 37 |

It is seen that in this test, all of the rutile samples performed better than the anatase samples as rutile utilizes the available light more efficiently than anatase due to its lower band gap. Again, the improvement in activity is seen with the increasing water soluble pH of the rutile samples, the high pH sample (example 1C) showing six times the activity of the anatase samples in the visible light test. As the calcined rutile samples are still white, it is possible to obtain a significant increase in photocatalytic activity in areas of low UV illumination without having to resort to colored photocatalysts.

Example 5

Nitrogen oxides, which are collectively referred to as $NO_x$, are an undesirable pollutant. Photocatalysts are used to reduce the $NO_x$ level in the atmosphere. The three rutile samples from example 1 were tested for their efficiency in removing $NO_x$ from a gas upon exposure to UV light at 365 nm wavelength. The results are provided below in Table V:

TABLE V

| Sample | % $NO_x$ removed |
|---|---|
| Example 1A | 3.0 |
| Example 1B | 3.8 |
| Example 1C | 13.0 |

The results clearly show that the sample with the higher water soluble pH is more efficient at removing $NO_x$.

Example 6

Rutile seeds were prepared by adding $TiOCl_2$ to a solution of NaOH until a pH of 0.5 and heating the solution to 80° C., holding for 2 hours then cooling to 50° C. The solution containing the rutile seeds was split into a number of batches that were adjusted to various pHs. The first four batches were filter washed with demineralized water to achieve a low conductivity and dried at 120° C. The remaining five batches were dewatered by vacuum filtration, repulped with a constant volume of water and dewatered a second time before drying at 120° C. In this set, one sample that had been adjusted to pH 3 could not be dewatered a second time as it passed through the filter paper and was dried with only one dewatering step being performed. The products were calcined at 600° C. for 2 hours. The calcined products along with the dry products from the repulp washed set were tested for water soluble pH, conductivity, and surface area. The results are provided below in Table VI:

TABLE VI

| Sample | Final pH | Dried or Calcined | Water Soluble pH | Conductivity (mS) | Surface Area ($m^2/g$) |
|---|---|---|---|---|---|
| 1 | 4 | Calcined | 8.6 | 0.065 | 40.3 |
| 2 | 5 | Calcined | 7.5 | 0.011 | 34.2 |
| 3 | 6 | Calcined | 7.55 | 0.011 | 41.0 |
| 4 | 7 | Calcined | 10.06 | 0.9 | 43.7 |
| 5 | 3 | Dried | 2.3 | 26.9 | 115.0 |
| 6 | 4 | Dried | 2.45 | 1.92 | 133.4 |
| 7 | 5 | Dried | 3.55 | 2.74 | 139.0 |
| 8 | 6 | Dried | 5.9 | 3.08 | 119.6 |
| 9 | 7 | Dried | 7.5 | 3.15 | 132.1 |
| 10 | 3 | Calcined | 9.43 | 25.8 | 32.5 |
| 11 | 4 | Calcined | 9.87 | 0.5 | 36.8 |
| 12 | 5 | Calcined | 9.76 | 2.16 | 42.4 |
| 13 | 6 | Calcined | 9.78 | 2.79 | 42.3 |
| 14 | 7 | Calcined | 9.95 | 3.89 | 44.7 |

The samples prepared above were tested for photocatalytic activity using the gas phase isopropanol method. Along with the amount of oxygen consumed, the selectivity of oxygen consumption toward $CO_2$ was also measured. A higher selectivity towards $CO_2$ is beneficial as it indicates complete mineralization. The results are provided below in Table VII:

TABLE VII

| Sample | % Oxygen Consumption | % Oxygen selectivity to $CO_2$ |
|---|---|---|
| 1 | 7.32 | 1.81 |
| 2 | 6.79 | 1.30 |
| 3 | 6.13 | 1.18 |
| 4 | 5.90 | 4.22 |
| 5 | 4.61 | 1.52 |
| 6 | 5.72 | 1.50 |
| 7 | 6.80 | 2.05 |
| 8 | 7.67 | 3.87 |

TABLE VII-continued

| Sample | % Oxygen Consumption | % Oxygen selectivity to $CO_2$ |
|---|---|---|
| 9 | 8.97 | 5.24 |
| 10 | 5.02 | 5.30 |
| 11 | 6.10 | 4.74 |
| 12 | 5.93 | 5.16 |
| 13 | 6.48 | 4.62 |
| 14 | 6.00 | 5.16 |

The results in table above were statistically analyzed by regression analysis and the following equations were obtained:

Oxygen Consumption=−0.67+0.0432(surface area)+ 0.538(pH)−0.747(log conductivity)

Selectivity to $CO_2$=−3.78+0.0220(surface area)+0.751 (pH)+0.842(log conductivity)

In both regressions the factors: surface area, water soluble pH and log (conductivity) were all significant to greater than 95% confidence.

The regressions confirm the effect of a higher water soluble pH values on both photocatalytic activity and selectivity to $CO_2$. Also of interest is the effect of conductivity. Although a negative factor with respect to oxygen consumption, it is a positive factor with respect to selectivity to $CO_2$. As complete mineralization is a necessary objective of photocatalysis, the regressions suggest a high surface area, a high water soluble pH and a higher conductivity are preferable for optimum performance.

Having thus described and exemplified the invention with a certain degree of particularity, it should be appreciated that the claims that follow are to be afforded a scope commensurate with the wording of each element of the claims and equivalents thereof.

The invention claimed is:

1. A method of photocatalytically treating a compound, said method comprising exposing a photocatalyst to light in the presence of the compound to be treated, wherein said photocatalyst is comprised of calcined titanium dioxide particles, at least 50% of said titanium dioxide particles being in the rutile crystal phase, and wherein said titanium dioxide particles (a) have a water soluble pH greater than 8; (b) have a surface area greater than 15m$^2$/gram; and (c) have a mean particle size less than 100 nm.

2. The method according to claim 1, wherein at least 80% of the titanium dioxide particles are in the rutile crystal phase.

3. The method of claim 1, wherein the compound to be photocatalytically treated is organic.

4. The method of claim 1, wherein the compound to be photocatalytically treated is inorganic.

5. The method of claim 4, wherein the compound to be photocatalytically treated is $NO_x$.

6. A method of photocatalytically treating a compound, said method comprising exposing a photocatalyst to light in the presence of the compound to be treated, wherein said photocatalyst is comprised of titanium dioxide particles, at least 50% of said titanium dioxide particles being in the rutile crystal phase, and wherein said titanium dioxide particles (a) have a water soluble pH greater than 8; (b) have a surface area greater than 15m$^2$/gram; (c) have a mean particle size less than 100 nm; and (d) have a conductivity of greater than 10 microsiemens per centimeter when mixed with demineralized water at a concentration of 6 grams per 100 grams of water.

7. The method according to claim 6, wherein at least 80% of the titanium dioxide particles are in the rutile crystal phase.

8. The method according to claim 6, wherein said titanium dioxide particles are calcined.

9. The method according to claim 6, wherein the conductivity is greater than 100 microsiemens per centimeter.

10. The method of claim 6, wherein the compound to be photocatalytically treated is organic.

11. The method of claim 6, wherein the compound to be photocatalytically treated is inorganic.

12. The method of claim 11, wherein the compound to be photocatalytically treated is $NO_x$.

13. A titanium dioxide photocatalyst comprised of titanium dioxide particles, at least 50% of said titanium dioxide particles being in the rutile crystal phase, and wherein said titanium dioxide particles: (a) have a water soluble pH greater than 8; (b) have a surface area greater than 15 m2/gram; (c) have a mean particle size less than 100nm; and (d) have a conductivity of greater than 10 microsiemens per centimeter when mixed with demineralized water at a concentration of 6 grams per 100 grams of water.

14. The photocatalyst of claim 13, wherein at least 80% of the titanium dioxide particles are in the rutile crystal phase.

15. The photocatalyst of claim 13, wherein said titanium dioxide particles are calcined.

16. A photocatalytic article comprising the photocatalyst of claim 13.

17. A ceramic, tile, glass, concrete, metal, cement, mortar or polymeric substances comprising the photocatalyst of claim 13.

18. A paint or coating comprising the photocatalyst of claim 13.

* * * * *